(12) United States Patent
Wiest et al.

(10) Patent No.: US 8,490,498 B2
(45) Date of Patent: Jul. 23, 2013

(54) MEASURING TUBE OF A MEASURING SYSTEM FOR DETERMINING AND/OR MONITORING FLOW OF A MEASURED MEDIUM THROUGH A MEASURING TUBE BY MEANS OF ULTRASOUND

(75) Inventors: Achim Wiest, Weil am Rhein (DE); Vivek Kumar, Muttenz (CH); Michal Bezdek, Aesch (CH); Pierre Ueberschlag, Saint-Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 205 days.

(21) Appl. No.: 13/142,459

(22) PCT Filed: Dec. 11, 2009

(86) PCT No.: PCT/EP2009/066913
§ 371 (c)(1),
(2), (4) Date: Jun. 28, 2011

(87) PCT Pub. No.: WO2010/076152
PCT Pub. Date: Jul. 8, 2010

(65) Prior Publication Data
US 2012/0017700 A1    Jan. 26, 2012

(30) Foreign Application Priority Data
Dec. 29, 2008   (DE) .......................... 10 2008 055 165

(51) Int. Cl.
*G01F 1/66*   (2006.01)
(52) U.S. Cl.
USPC ..................................... 73/861.28

(58) Field of Classification Search
USPC .............................. 73/861.28, 861.29, 861.27
See application file for complete search history.

(56) References Cited

U.S. PATENT DOCUMENTS

| | | | | |
|---|---|---|---|---|
| 4,754,650 A | * | 7/1988 | Smalling et al. | 73/861.28 |
| 4,914,959 A | * | 4/1990 | Mylvaganam et al. | 73/861.28 |
| 5,179,862 A | | 1/1993 | Lynnworth | |
| 5,645,071 A | * | 7/1997 | Harnoncourt et al. | 600/532 |
| 5,717,145 A | | 2/1998 | Yasuhara et al. | |
| 7,987,732 B2 | * | 8/2011 | Konzelmann et al. | 73/861.29 |

FOREIGN PATENT DOCUMENTS

| | | |
|---|---|---|
| DE | 197 31 173 A1 | 1/1999 |
| DE | 199 44 829 A1 | 6/2001 |
| EP | 0 804 717 B1 | 11/1997 |

OTHER PUBLICATIONS

English translation of the International Preliminary Examination Report, Dec. 11, 2009.
German Search Report.
International Search Report.

* cited by examiner

*Primary Examiner* — Jewel V Thompson
(74) *Attorney, Agent, or Firm* — Bacon & Thomas, PLLC

(57) ABSTRACT

A measuring tube, a measuring system and a method for determining and/or monitoring flow through a measuring tube, comprising a measuring tube, on which ultrasonic transducers are releasably placeable. The ultrasonic transducers transmit and/or receive ultrasonic signals, which pass through the measuring tube approximately coaxially to the measuring tube axis.

15 Claims, 10 Drawing Sheets

MEASURING TUBE OF A MEASURING SYSTEM FOR DETERMINING AND/OR MONITORING FLOW OF A MEASURED MEDIUM THROUGH A MEASURING TUBE BY MEANS OF ULTRASOUND

TECHNICAL FIELD

The present invention relates to a measuring tube, a measuring system and a method for determining and/or monitoring flow of a measured medium through a measuring tube by means of ultrasound. The measuring tube has a measuring tube inlet and a measuring tube outlet, wherein the measuring tube inlet has a measuring tube inlet axis. The measuring tube inlet axis forms with the measuring tube axis an angle $\alpha$ not equal to 90°. The measuring tube outlet has a measuring tube outlet axis, the measuring tube outlet axis forms with the measuring tube axis an angle $\beta$ not equal to 90°. The measuring system has at least two electromechanical transducer elements, which lie opposite one another in an essentially planparallel manner, and which, in each case, can be acoustically coupled with the measuring tube.

BACKGROUND DISCUSSION

Ultrasound flow measuring devices are often used in process and automation technology. They permit volume flow and/or mass flow in a pipeline to be determined in simple manner.

Known ultrasound flow measuring devices frequently work according to the Doppler principle or according to the travel time difference principle.

In the case of the travel time difference principle, the different travel times of ultrasonic pulses are evaluated relative to the flow direction of the liquid.

For this, ultrasonic pulses are transmitted at a certain angle to the tube axis, both in the direction of flow as well as also counter to the flow. From the travel time difference, the flow velocity can be determined, and therewith, in the case of a known diameter of the pipeline section, also the volume flow.

In the case of the Doppler principle, ultrasonic waves with a certain frequency are coupled into the liquid and the ultrasonic waves reflected by the liquid are evaluated. From the frequency shift between the in-coupled and the reflected waves, the flow velocity of the liquid can likewise be determined.

Reflections in the liquid occur, however, only when small air bubbles or impurities are present in the liquid, so the Doppler principle is made use of mainly in the case of contaminated liquids.

The ultrasonic waves are produced or received with the assistance of so-called ultrasonic transducers. For this, ultrasonic transducers are firmly attached to the tube wall of the relevant pipeline section. More recently, clamp-on ultrasound flow measuring systems are also obtainable. In the case of these systems, the ultrasonic transducers are only pressed onto the tube wall with a clamp. Such systems are known, for example, from EP 686 255 B1, U.S. Pat. Nos. 4,484,478 or 4,598,593.

A further ultrasound flow measuring device, which works according to the travel time difference principle, is known from U.S. Pat. No. 5,052,230. The travel time is ascertained here by means of short ultrasonic pulses.

A large advantage of clamp-on ultrasound flow measuring systems is that they do not contact the measured medium and are placed on an already existing pipeline.

The ultrasonic transducers are normally composed of a piezoelectric element, also called a "piezo" for short, and a coupling layer, also called a "coupling wedge" or, less frequently, a "lead-in element". The coupling layer is, in such case, most often manufactured from synthetic material; the piezoelectric element is, in industrial process measurements technology, usually composed of a piezoceramic. In the piezoelectric element, the ultrasonic waves are produced, and, via the coupling layer, are conducted to the tube wall, and are from there led into the liquid. Since the velocities of sound in liquids and synthetic materials are different, the ultrasonic waves are refracted during the transition from one medium to the other. The angle of refraction is determined to a first approximation according to Snell's law. The angle of refraction is thus dependent on the ratio of the propagation velocities in the media.

Between the piezoelectric element and the coupling layer, another coupling layer can be arranged, a so-called adapting or matching layer. In such case, the adapting or matching layer performs the function of transmission of the ultrasonic signal, and simultaneously of reduction of a reflection off of interfaces between two materials caused by different acoustic impedances.

In U.S. Pat. No. 5,179,862, an ultrasonic measuring system is disclosed, wherein a flexible measuring tube—a hose—can be drawn into in a fixed apparatus. The fixed part of the measuring system accommodates the ultrasonic transducer. If an ultrasonic signal runs axially through the measuring tube, the measuring tube is bent at two locations lying opposite each other. Between the bends is thus located the actual measuring path of the measuring tube; the bends could be considered as a measuring tube inlet and measuring tube outlet with the same diameter as the measuring tube. At the bends, the coupling elements of the ultrasonic transducers couple the ultrasonic signals into the measuring tube and, respectively, out of the measuring tube. In this regard, the coupling elements have corresponding in-coupling and/or out-coupling surfaces, which, in each case, form an angle with respect to the piezoelectric elements, wherein the piezoelectric elements, for their own part, are arranged planparallel to one another and perpendicular to the measuring tube axis. The sound-emitting or sound-receiving surfaces of the piezoelectric elements are at least the size of the diameter of the measuring tube. A disadvantage of angles between the sound-emitting or sound-receiving surfaces of the piezoelectric elements and the in-coupling or out-coupling surfaces of the coupling elements is that the velocities of sound in the coupling elements and in the measuring tube and/or in the measured medium must be matched to one another and with the angles to obtain a signal path for the ultrasonic signal, which is parallel to the measuring tube axis.

Other examples of ultrasound flow measuring systems with ultrasonic transducers arrangeable axially on the ends of a measuring tube are shown in U.S. Pat. Nos. 5,463,906 and 5,717,145. Also applied are piezoelectric elements with sound-emitting or sound-receiving surfaces, which at least correspond to the size of the diameter of the measuring tube, in order to metrologically register the entire measuring tube cross section.

Also EP 1 760 436 A2 shows an ultrasound flow measuring system with a measuring tube, through which ultrasound waves are axially projected. The measuring tube includes piezoelectric elements, whose sound-emitting or sound-receiving surfaces have a diameter, which is at least as large as the diameter of the measuring tube.

In contrast, in US 2007/0227263 A1, an ultrasound flow measuring system is described, which has a measuring tube, which has four openings. Two openings are provided for the connection to the process. These openings form, respectively, a measuring tube inlet, and a measuring tube outlet, and which are perpendicular to the measuring tube axis. The measuring tube inlet and the measuring tube outlet are both on the same side of the measuring tube. The ultrasonic transducers are inserted in the two other openings of the measuring tube. The coupling elements of the ultrasonic transducers axially close off the measuring tube. The ultrasonic transducers are arranged essentially planparallely and at an angle of 90° with respect to the measuring tube axis. The in-coupling and/or out-coupling surfaces of the coupling elements of the ultrasonic transducer for coupling the ultrasonic signals into and out of the measured medium are convex. Directly before the in-coupling and/or out-coupling surfaces, thus in the region of the coupling of the ultrasonic signals into or out of the measured medium, the measuring tube has an enlarged cross section. The diameters of the essentially disc-shaped ultrasonic transducers are larger than the diameters of a significant part of measuring path of the measuring tube. Due to the cross sectional change of the measuring tube before the in-coupling and/or out-coupling surfaces, there arise chambers, where the measured medium can collect just before the in-coupling and/or out-coupling surfaces. Since the diameter of the measuring tube inlets or measuring tube outlets and the measuring path of the measuring tube itself are essentially equal, the flow of the measured medium before the in-coupling and/or out-coupling surfaces is slowed, and in the measuring tube, in an essential part the measuring path, it is accelerated.

WO 2008/101662 A2 also has a similar construction of the measuring cell. Here, the diameters of the measuring tube inlets or measuring tube outlets and of the measuring tube itself are essentially equal, and the measuring tube inlets or measuring tube outlets are arranged at an angle smaller than 90° relative to the measuring tube axis; however, the flow of the measured medium is also slowed here before the in-coupling and/or out-coupling surfaces, which here are also in turn formed by the coupling elements of the ultrasonic transducers installed into the measuring cell, and are arranged at an angle of 90° to the measuring tube axis. Here, chambers are likewise formed in front of the in-coupling and out-coupling surfaces. The sound-emitting and sound-receiving surfaces of the piezoelectric elements are each larger than the diameter of the measuring tube; however, the surface of the coupling element for coupling sound in or out axially closes off the measuring tube and is, consequently, of equal size.

SUMMARY OF THE INVENTION

An object of the invention is to provide a highly accurate measuring system with cost effectively replaceable measuring tubes/measuring cells.

The object is achieved by a measuring tube for use in a measuring system for determining and/or monitoring flow of a measured medium through the measuring tube, wherein the measuring tube has a measuring tube axis and with a first ultrasonic transducer seat for accommodating at least a first electromechanical transducer element and at least one additional, second ultrasonic transducer seat for accommodating at least a second electromechanical transducer element, and a measuring tube inlet and a measuring tube outlet, wherein the measuring tube inlet has a measuring tube inlet axis having an angle $\alpha$ not equal to 90° relative to the measuring tube axis and wherein the measuring tube outlet has a measuring tube outlet axis having an angle $\beta$ not equal to 90° relative to the measuring tube axis, wherein the first ultrasonic transducer seat forms a first coupling element between the first electromechanical transducer element and the measured medium and a has first sound in- and/or sound out-coupling surface having a midpoint, wherein the second ultrasonic transducer seat forms a second coupling element between the second electromechanical transducer element and the measured medium and has a second sound in- and/or sound out-coupling surface having a midpoint, wherein the ultrasonic transducer seats are so embodied that a first measuring path between the two electromechanical transducer elements is at an angle $\zeta$ to the measuring tube axis and extends on the side of the measuring tube axis, on which the measuring tube outlet is located.

The term "ultrasonic transducer seat" refers to the seat of an ultrasonic transducer. An ultrasonic transducer is, in general, composed of at least one electromechanical transducer element. Most often, an ultrasonic transducer is composed, furthermore, however, supplementally, also of a coupling element and/or an adapting, or matching, layer. According to the invention, the ultrasonic transducer seat is suitable for seating a usual ultrasonic transducer, i.e. to couple such acoustically with the measuring tube and/or with a coupling element integrated in the measuring tube, at least, however, the seating is so embodied, that it is suitable, to seat an electromechanical transducer element and to couple such acoustically with the measuring tube and/or with a coupling element integrated in the measuring tube. The ultrasonic transducer seats, in such case, make use of functional surfaces, or coupling locations, in the following called transducer seating surfaces, for coupling electromechanical transducers, or ultrasonic transducers.

The electromechanical transducer element transduces the ultrasonic signals according to the principle of electrostriction or magnetostriction. The term "magnetostriction" refers to the length change of a ferromagnetic material as a result of an applied magnetic field. The term "electrostriction" refers, in contrast, to the deformation of a dielectric material as a result of an applied electrical field. The deformation is, in such cases, generally not dependent on the direction of the field. The piezo effect is, thus, in particular, an electrostriction. In an embodiment, the electromechanical transducer element is a piezoelectric element.

The electromechanical transducer element produces ultrasonic signals and/or converts received ultrasonic signals, in turn, into electrical signals, and is, thus, an essential component of an ultrasonic transducer. Ultrasonic transducers with at least one electromechanical transducer element produce ultrasonic signals in the form of ultrasonic waves. In liquids, ultrasonic waves propagate only as longitudinal waves. The excited particles oscillate, in such case, in the propagation direction at the magnitude of the amplitude. An ultrasonic signal is thus comprised of at least one ultrasonic wave having a wavefront. The wavefront is, in such case, perpendicular to the propagation direction of the ultrasonic waves.

An ultrasonic signal is limited in its width, i.e. the wavefront has a finite expanse. The essential factor limiting the width of an ultrasonic signal is the area of the ultrasonic transducer, from which the ultrasonic wave is transmitted and/or the area of the sound in- and/or sound out-coupling surface, which contacts the measured medium in the case of filled measuring tube. For purposes of simplification, it is assumed that an ultrasonic signal of limited width propagates as a ray on a sound, or signal, path. The width of the signal path is, in such case, taken to be a point. According to model, an ultrasonic signal thus propagates on a straight signal path. The propagation direction of the ultrasonic waves thus corresponds to the direction of the ultrasonic signal along the signal path. A signal path for determining and/or monitoring flow of a measured medium through a measuring tube is, at times, also referred to as the measuring path.

If the sound in- and/or sound out-coupling surfaces possess an approximately circularly round cross section, then the midpoint is equally the center of gravity of the sound in- and/or sound out-coupling surfaces. If the shape of the sound in- and/or sound out-coupling surfaces is not circular, for instance, if it is oval, quadrangular, hexagonal, octagonal or polygonal, the midpoint is especially the center of gravity of the sound in- and/or sound out-coupling surfaces.

Referred to as the expanse of an area is the connecting line of two non-neighboring points of the area's edge drawn through the midpoint of the area. The greatest expanse is correspondingly the longest connecting line between two points of the surface edge drawn through the midpoint of the area. In the case of an ellipse, the main axis, thus the connection between the endpoints of the transverse diameter, the points of the ellipse with the largest distance to the midpoint, acts as greatest expanse. In the case of polygons having at least four corners, the longest diagonal is the greatest expanse. If the sound in- and/or sound out-coupling surface is circular, thus if it has a circular cross section, then all diameters are approximately equal and, according to an embodiment of the invention, amount to, at most, half, especially at a maximum a third, of the inner diameter of the measuring tube.

If the measuring tube has a cross section other than approximately circular, e.g. it is a square or rectangular tube or if the cross section of the inner region of the measuring tube, through which the measured medium can flow, is, for example, elliptical, then, instead of the inner diameter, likewise the greatest expanse of the cross section of the measuring tube is taken into consideration, i.e. thus, that the greatest expanse of the sound in- and/or sound out-coupling surfaces amounts to, at most, half of the largest expanse of the measuring tube cross section, especially, at most, a third. The cross section of the measuring tube is, in such case, perpendicular to the measuring tube axis.

If the sound in- and/or sound out-coupling surfaces are planparallelly oppositely lying to one another, then the first sound in- and/or sound out-coupling surface is parallel to the second sound in- and/or sound out-coupling surface. According to the invention, the first sound in- and/or sound out-coupling surface is not only parallel to the second sound in- and/or sound out-coupling surface, but is also directly opposite thereto, i.e. the connecting line between the centers thereof is perpendicular to the respective sound in- and/or sound out-coupling surfaces. If the two surfaces have the same cross section and they are not twisted relative to one another, in the case of a shifting along the connecting line, they would completely coincide with one another.

Both the measuring tube axis, as well as also the measuring tube inlet axis and measuring tube outlet axis are considered to be straight connecting lines between at least two centers of the measuring tube, or of the measuring tube inlet or of the measuring tube outlet, respectively. Said axes are referenced to the respective inner diameters, that is to say, it does not matter whether, respectively, the measuring tube or the measuring tube inlet or the measuring tube outlet has a circular or polygonal cross section; the centers necessary and sufficient for forming the axes are, just as in the case of determining the centers of the electromechanical transducer elements, centers of gravity of certain free, or inner, cross sectional areas of the measuring tube, or of the measuring tube inlet or of the measuring tube outlet, respectively. Since the cross section and therewith the inner diameter of the measuring tube and/or of the measuring tube inlet and/or of the measuring tube outlet can change over the particular length of the measuring tube and/or of the measuring tube inlet and/or of the measuring tube outlet both in its dimension as well as also in its shape, at least two particular cross sections are required for determining the axes. In an embodiment with constant free cross sectional areas for the tube sections, the axes extend through all centers of all cross sections. The cross sectional areas at the beginning and at the end of the measuring tube and/or of the measuring tube inlet and/or of the measuring tube outlet are especially taken into consideration for determining the axes.

In addition to at least one electromechanical transducer element, ultrasonic transducers usually have a so-called coupling layer or a so-called coupling element. The coupling layer conducts the ultrasonic signals from the electromechanical transducer element to the measured medium and, in each case, couples them in or out of this. The coupling layer is in such case preferably composed of a material, which has certain acoustic properties, e.g. a predeterminable acoustic impedance and/or a predeterminable velocity of sound. In a special form of embodiment, the measuring tube serves as the coupling layer. If, for example, a steel tube is used as the measuring tube and the electromechanical transducer element is a piezoelectric element, a coupling layer is then providable as an adapting or matching layer between the transducer element and measuring tube. If, however, the measuring tube is made of synthetic material, especially a polymer, and/or if the transducer element is an electrostrictive element, the electromechanical transducer element is then placeable directly on the measuring tube. The measuring tube performs, in this case, the task of the coupling layer, i.e. the acoustic coupling between the transducer element and measured medium.

Thus, a measuring system of the invention includes at least two electromechanical transducer elements, e.g. piezoelectric elements, which transmit or receive ultrasonic signals along at least a first signal path, and a coupling layer in the region between an electromechanical transducer element and the measured medium, in each case, conducts the ultrasonic signals onto or from the first signal path. Instead of one electromechanical transducer element, a number of transducer elements can also be put to use. These are, for example, arranged next to one another and/or on top of one another in so-called stacks. In the stacks, the individual elements are contacted and connected in series or in sandwich construction.

The measuring tube of the invention is therefore so formed that, in the region of the first measuring path, a fast flow forms. The ultrasonic transducer seats are thus so embodied, that the measuring path between the two electromechanical transducer elements lies at an angle $\zeta$ relative to the measuring tube axis and extends on the side of the measuring tube axis, on which the fast, or the accelerated, flow is located. Measuring tube inlet and measuring tube outlet are correspondingly so arranged that a fast flow forms in the measuring tube on a side of the measuring tube axis, on which the measuring tube outlet is located.

In a further development of the solution of the invention, a connecting line between the centers of the first and second sound in- and/or sound out-coupling surfaces lies at an angle $\eta$ relative to the measuring tube axis (8) and extends on the side of the measuring tube axis, on which the measuring tube outlet is located.

The measuring tube axis and the measuring tube outlet axis define a first imaginary plane. A second imaginary plane is then perpendicular to the first imaginary plane and intersects the first imaginary plane in a first straight line of intersection.

In an embodiment, this first straight line of intersection is the measuring tube axis. The connecting line then does not intersect the second imaginary plane.

In an additional further development of the measuring tube of the invention, the measuring tube is so embodied that the first and the second sound in- and/or sound out-coupling surfaces face one another essentially planparallelly.

Another further development of the invention provides that the ultrasonic transducer seats have, in each case, at least one transducer seating surface, which can be acoustically coupled with an ultrasonic transducer without requiring a supplemental coupling element, for example, thus can be acoustically coupled directly with an electromechanical transducer element of the ultrasonic transducer. Such transducer seating surfaces face one another essentially planparallelly and, in each case, have a center, wherein a connecting line between the centers of the first and second transducer seating surface lie at an angle θ relative to the measuring tube axis and extends on the side of the measuring tube axis, on which the measuring tube outlet is located.

A transducer seating surface is a functional surface, on which the electromechanical transducer elements are placeable and acoustically coupleable, wherein the ultrasonic transducer seats can, in each case, function as coupling element. The ultrasonic transducer seats are, in an embodiment of the solution of the invention, so embodied that the electromechanical transducer elements face one another essentially planparallelly and, in each case, are acoustically coupleable with the measuring tube and that a connecting line between the centers of the first and second electromechanical transducer elements lies at an angle γ relative to the measuring tube axis and extends on the side of the measuring tube axis, on which the measuring tube outlet is located. In a further development of the solution of the invention, the angle γ amounts to approximately 0°, or 180°, i.e. the connecting line and the measuring tube axis are parallel to one another. In another embodiment, the angle γ is not equal to 0°, or 180°, i.e. connecting line and measuring tube axis are inclined relative to one another, wherein the connecting line does not cut the measuring tube axis. In other embodiments, the angle γ is approximately 1° or 2° or 5° or 8° or 10° or 12° or 15°. Especially, the angle γ is smaller than 35°.

According to an additional embodiment, the acoustically coupleable ultrasonic transducers, at least, thus, electromechanical transducer elements, arrangeable on the transducer seating surfaces have, in each case, a center and a connecting line between the centers of the first and second ultrasonic transducers, thus e.g. the centers of the first and second electromechanical transducer elements, lies at an angle γ relative to the measuring tube axis and extends on the side of the measuring tube axis, on which the measuring tube outlet is located.

The electromechanical transducer elements are, in an embodiment, releasably acoustically coupled with the measuring tube. They are, at any time, replaceable, even with ultrasonic transducers for another variable, so long as the new transducers fit into the seating. The ultrasonic transducers are thus not fixed, or integral, components of the measuring tube.

Another further development of the invention provides that ζ equals γ and/or that ζ equals η and/or that ζ equals θ and/or that η equals γ and/or that η equals θ and/or that θ equals γ.

In an embodiment of the measuring tube, such is so embodied that the transducer seating surfaces and the sound in- and/or sound out-coupling surfaces face one another essentially planparallelly, i.e. that both of the transducer seating surfaces are perpendicular to the signal path, as well as also that the sound in/out coupling surfaces are perpendicular to the signal path.

Another further development of the measuring system of the invention provides that the measuring tube inlet and the measuring tube outlet are arranged on mutually oppositely lying sides of the measuring tube. The measuring tube inlet and the measuring tube outlet are thus located on different sides of the imaginary second plane.

A further development of the measuring system of the invention provides that the angle α amounts to approximately 45°. In an additional embodiment, the angle α amounts according to the invention to approximately 45° and/or the angle β amounts according to the invention to approximately 45°. In another embodiment, the angles α and β lie each between 30 and 60°.

According to an additional further development, the measuring tube axis, the measuring tube inlet axis and the measuring tube outlet axis lie essentially in one plane. All three axes lie in the first imaginary plane. An embodiment of the measuring tube provides that the connecting line between the centers of the first and second sound in- and/or sound out-coupling surfaces lies essentially in the same plane. In another embodiment of the invention to, also the connecting line between the centers of the electromechanical transducer elements lies in the first imaginary plane.

A further development of the solution provides that the measuring tube has an additional inlet segment, thus, a second measuring tube inlet, and an additional outlet segment, thus, a second measuring tube outlet, which additional inlet segment is arranged on the measuring tube inlet and which additional outlet segment is arranged on the measuring tube outlet, wherein the additional inlet segment has a central axis, thus a second measuring tube inlet axis, and the additional outlet segment has a central axis, thus a second measuring tube outlet axis, wherein the second measuring tube inlet axis has an angle of essentially 90° relative to the measuring tube axis and wherein the second measuring tube outlet axis has an angle of essentially 90° relative to the measuring tube axis.

In an embodiment, thus, the first measuring tube inlet has an angle of about 45° relative to the measuring tube and the additional measuring tube inlet, in turn, an angle of about 45° relative to the first measuring tube inlet.

The central axes are, in such case, again the connecting lines between the centers of the free cutting planes through the respective ends of the additional in- and outlet segments. The additional in- and/or outlet segments are, in an embodiment, straight, i.e. their central axes are formed essentially as straight lines.

The second measuring tube inlet and the second measuring tube outlet, are releasably securable on, respectively, the first measuring tube inlet, and the first measuring tube outlet, wherein both the second measuring tube inlet as well as also the second measuring tube outlet contact the measuring tube directly. They border on the end of the measuring tube inlet and, respectively, the measuring tube outlet, which face away from the measuring tube. In another embodiment, the second measuring tube inlet and/or the second measuring tube outlet are integral components of the measuring tube. In a variant of the invention, the measuring tube with measuring tube inlet and measuring tube outlet and/or with second measuring tube inlet and/or second measuring tube outlet is monolithically constructed.

A further developed measuring tube of the invention is composed of a polymer material. Examples of suitable polymer materials are PPSU, PEI, PP, PE and PVDF. The measuring tube of polymer material is, in an embodiment, gamma sterilizable.

Especially, the first measuring tube inlet and/or the first measuring tube outlet, as well as also the second measuring tube inlet and/or the second measuring tube outlet are manufactured of the same material. In an embodiment of the measuring tube of the invention, the measuring tube comprises a gamma sterilizable, synthetic material.

In an additional further development of the solution of the invention, the area of the first sound in- and/or sound out-coupling surface is not equal to the area of the first transducer seating surface and/or the area of the second sound in- and/or sound out-coupling surface is not equal to the area of the second transducer seating surface.

The measuring tube includes coupling elements, here especially the ultrasonic transducer seats, which from the transducer seating surface up to the sound in- and/or sound out-coupling surface exhibit a narrowing of the cross section of the coupling element or the coupling elements exhibit from the transducer seating surface up to the sound in- and/or sound out-coupling surface exhibit an increasing of the cross section of the coupling element. The narrowing and/or the increasing can, in such case, be linear, discrete or exponential. By way of example, such a coupling element is cylindrical in longitudinal section, in the shape of a frustum or in the shape of an exponential horn. In this way, for example, an electromechanical transducer element of a certain size can be used with measuring tubes of different sizes, especially different inner diameters.

Another further development of the invention provides that the measuring tube has a third ultrasonic transducer seat for seating at least a third electromechanical transducer element and fourth ultrasonic transducer seat for seating at least a fourth electromechanical transducer element, wherein the third ultrasonic transducer seat is a third coupling element between the third electromechanical transducer element and the measured medium and has a third sound in- and/or sound out-coupling surface, wherein the fourth ultrasonic transducer seat is a fourth coupling element between the fourth electromechanical transducer element and the measured medium and has a fourth sound in- and/or sound out-coupling surface, wherein the third and fourth ultrasonic transducer seats are so embodied that a second measuring path between the third and the fourth electromechanical transducer element lies at an angle $\xi$ relative to the measuring tube axis and extends on the side of the measuring tube axis, which lies opposite the first measuring path.

The previously mentioned embodiments and further developments relative to the angle of the first measuring path and the dimensions concerning the individual components of the first measuring path, such as e.g. the transducer seating surfaces, the sound in- and/or sound out-coupling surfaces, etc., are here likewise transferable to the second measuring path, especially, in a particular embodiment, the first and the second measuring paths are parallel to one another.

In a further development of the measuring tube of the invention, at least one ultrasonic transducer seat is embodied pot shaped, with the transducer seating surface of the ultrasonic transducer seat being the pot floor.

In an additional further development of the measuring system of the invention, narrowing rings are provided in the measuring tube cross section. The rings perform a cross section narrowing function in the measuring tube, and serve for flow conditioning or targeted acceleration or slowing of flow of the measured medium in the measuring tube. The rings extend into the measuring tube by at least $1/5$ of the inner diameter of the measuring tube, especially at least $1/10$, especially at least $1/30$. Thus, an individual ring is provided, which is emplaced in the measuring tube in the region of the measuring tube inlet, or a number of rings—especially two rings—are provided, these rings, in each case, having the same distance from their nearest measuring tube inlet or measuring tube outlet. The separation of the ring in region of the measuring tube inlet from the measuring tube inlet amounts in such case to between 0 and half the length of the measuring tube, or half of the distance between the first and the second surfaces for coupling sound in and/or coupling sound out.

According to an additional further development of the invention, the distance between a first surface for coupling sound in and/or out and a second surface for coupling sound in and/or out amounts to at most 15 times the inner diameter of the measuring tube, according to an embodiment to at most 12 times, according to another embodiment to at most ten times, in another embodiment at most eight times, according to another embodiment at most five times and according to a further embodiment at least two times the inner diameter of the measuring tube.

The first surface for coupling sound in and/or coupling sound out is, in such case, associated with the first electromechanical transducer element, i.e. the ultrasonic signal, which is produced by the first electromechanical transducer element is coupled into the measured medium via the first surface for coupling sound in and/or out. Likewise, the ultrasonic signal received by the first electromechanical transducer element is coupled out of the measured medium via the first surface for coupling sound in and/or coupling sound out. The same is true for the second surface for coupling sound in and/or coupling sound out and for the second electromechanical transducer element.

In an additional further development of the solution of the invention, the measuring tube inlet and/or the measuring tube outlet have approximately the same cross section as the measuring tube, i.e. the inner diameter of the measuring tube inlet and/or of the measuring tube outlet and/or of the measuring tube are, in the case of an approximately circularly round, measuring tube inlet and/or measuring tube outlet and/or measuring tube, approximately the same.

In an additional further development of the solution of the invention, the inner diameter of the measuring tube amounts to at least 1 mm, especially at least 2 mm, in another embodiment to at least 5 mm, in an additional embodiment to at least 10 mm, especially at least 20 mm, and in additional embodiments, the inner diameter of the measuring tube amounts to up to 200 mm. According to the invention, the length of the measuring tube amounts to at least 5 mm and can, for example, amount to up to 1000 mm. In an embodiment, the measuring tube length amounts to about twice the inner diameter of the measuring tube, in another embodiment to about three times or especially five times the inner diameter of the measuring tube, or the measuring tube length amounts to up to ten times the inner diameter of the measuring tube.

The measuring tube is so embodied according to the invention that it is applicable for determining and/or monitoring flow of Newtonian liquids such as water or liquids with a viscosity between 0.1 and 20 mPas.

BRIEF DESCRIPTION OF THE DRAWINGS

The invention will now be explained in greater detail based on the appended drawing, in which, in each case, an example of an embodiment is presented. Equal elements are provided in the figures with equal reference characters. The figures of the drawing show as follows.

DETAILED DISCUSSION IN CONJUNCTION WITH THE DRAWINGS

Figure 1:
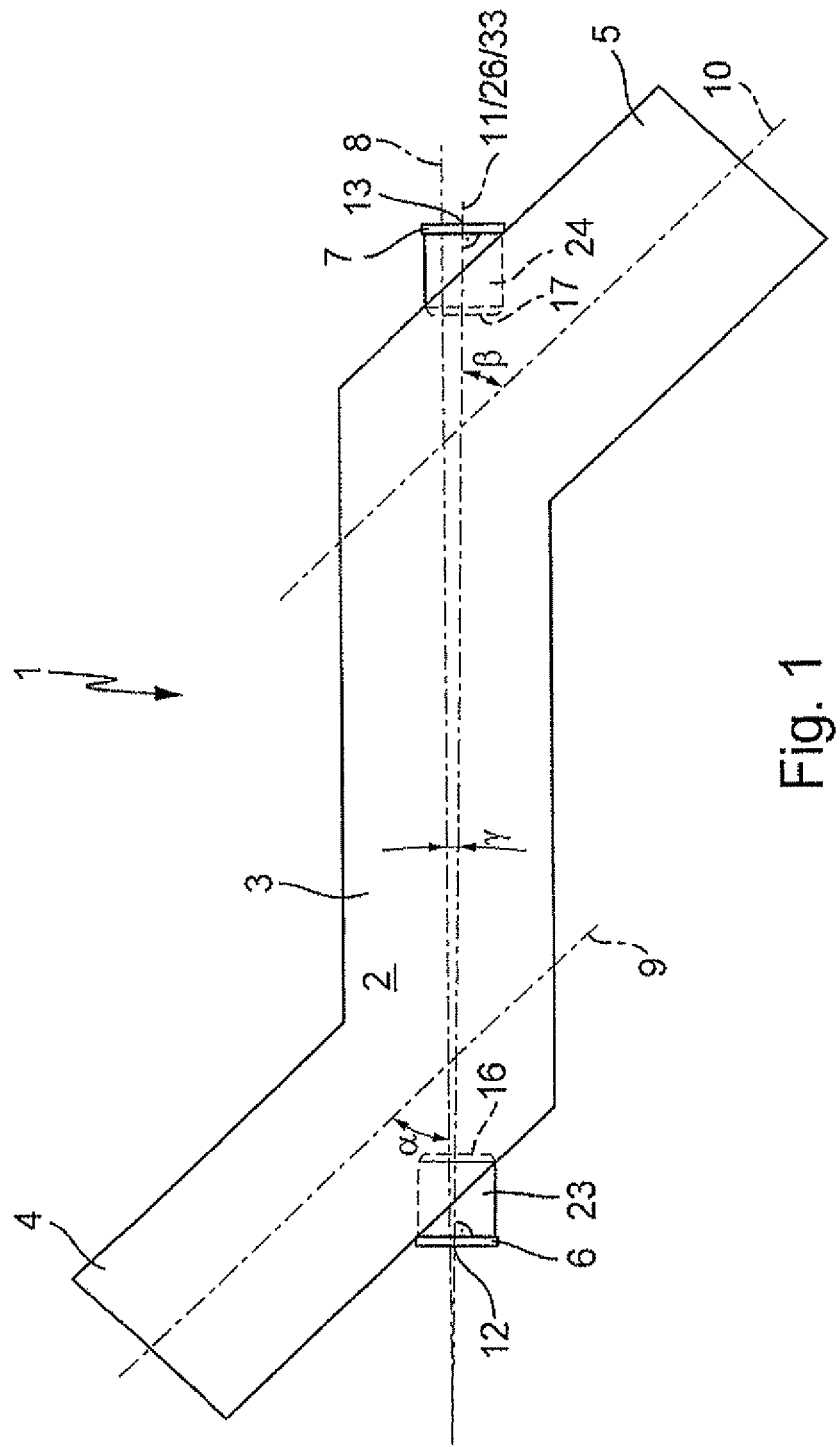
FIG. 1 shows schematically, a measuring system of the invention having a measuring tube of the invention.

FIG. 1 shows, schematically in section, a measuring tube 3 of the invention for a measuring system 1 of the invention. Measuring tube 3 has a first measuring tube inlet 4 and a first measuring tube outlet 5. Measuring tube inlet 4 has a cross section, which is approximately constant over its length. In this embodiment, this cross section is approximately equal to the cross section of measuring tube 3, both in shape as well as also in size. Measuring tube outlet 5, in contrast, is slightly conical, so that the cross section of measuring tube outlet 5 bordering on the measuring tube is somewhat larger than the cross section of measuring tube outlet 5 usable as a process connection. Both the measuring tube axis 8, as well as also the measuring tube inlet axis 9 and the measuring tube outlet axis 10 lie in one plane, here the plane of the drawing, with measuring tube inlet 4 and measuring tube outlet 5 being arranged on oppositely lying sides of the measuring tube 3.

Disc-shaped electromechanical transducer elements 6 and 7 for conversion of electrical signals into ultrasonic signals and/or vice versa are acoustically coupled on ultrasonic transducer seats 23 and 24. Ultrasonic transducer seats 23 and 24 have essentially cylindrical shapes. They assume the function of coupling the ultrasonic signals into the measured medium 2. To this end, the ultrasonic signals are produced by the electromechanical transducer elements 6, 7 and are coupled at the transducer seat surfaces into the ultrasonic transducer seats 23 and 24, which, for their own part, conduct the ultrasonic signals to measured medium 2 and, via their surfaces 16 and 17 for coupling sound in or coupling sound out, couple the ultrasonic signals into the measured medium 2. If the ultrasonic signals are led by the measured medium 2 back to the electromechanical transducer elements, they are then coupled out of measured medium 2 at surfaces 16 and 17 for coupling sound in or coupling sound out, and conducted by the ultrasonic transducer seats 23 and 24 to the electromechanical transducer elements 6, 7. Surfaces 16 and 17 for coupling sound in or coupling sound out are here smaller than the surfaces of electromechanical transducer elements 6, 7. Ultrasonic transducer seats 23 and 24 have, at least in the region of surfaces 16 and 17 for coupling sound in or coupling sound out, the shape of an exponential horn. The ultrasonic signals propagate along a so-called signal or measuring path. As is modeled here, a line-shaped measuring path is delineated. The wave fronts of the ultrasonic signal are essentially perpendicular to the measuring path.

Both the surfaces 16 and 17 for coupling sound in or coupling sound out, as well as also the electromechanical transducer elements 6, 7 and the transducer seat surfaces of ultrasonic transducer seats 23 and 24 possess an essentially circularly round cross section. The centers 27, 28 of surfaces 16 and 17 for coupling sound in or coupling sound out and the centers of electromechanical transducer elements 6, 7 and those of the transducer seat surfaces of ultrasonic transducer seats 23 and 24 lie on a single straight line.

Since electromechanical transducer elements 6, 7 are approximately planparallel to the surfaces 16, 17 for coupling sound in or coupling sound out, and surfaces 16, 17 for coupling sound in or coupling sound out lie essentially planparallelly opposite one another, and the cross sections of ultrasonic transducer seats 23 and 24 axially symmetrically change from the transducer seat surfaces to surfaces 16, 17 for coupling sound in or coupling sound out, the measuring path is considered to coincide with the connecting line 11 between the centers 12 and 13 of electromechanical transducer elements 6, 7. Therewith, the angle $\gamma$ between connecting line 11 between centers 12 and 13 of first and second electromechanical transducer elements 6, 7 and the measuring tube axis 8 and the angle $\eta$ between the connecting line between the centers of surfaces for coupling sound in and/or out 16, 17 and measuring tube axis 8, and the angle $\theta$ between the connecting line between the centers of the transducer seat surfaces and measuring tube axis 8 are equal, and are also equal to the angle $\zeta$ of the measuring path.

The measuring path, or also signal path, which is here equal to connecting line 11 between the centers 12 and 13 of electromechanical transducer elements 6, 7, is slightly inclined toward measuring tube axis 8. Angle $\zeta$ or $\gamma$ amounts here to about 5°. However, the measuring path 11 extends completely on the side of measuring tube axis 8, on which the measuring tube outlet 5 is located. A first imaginary plane, as already described, is defined by measuring tube axis 8 and the measuring tube inlet and measuring tube outlet axes 9 and 10. A second imaginary plane is perpendicular to the first imaginary plane, and intersects the first imaginary plane in a first straight line of intersection. This first straight line of intersection is, in this embodiment, measuring tube axis 8. Then, the connecting line between the centers of surfaces 16, 17 for coupling sound in and/or coupling sound out—here, the measuring path—does not intersect the second imaginary plane. The measuring path 11 is located on the side of the second imaginary plane, on which also the measuring tube outlet 5 is arranged on the measuring tube 3.

Due to the already mentioned conditions, the areas of the electromechanical transducer elements 6, 7, of the transducer seat surfaces and especially of the surfaces 16, 17 for coupling sound in and/or out are smaller than the free cross section of the measuring tube 3, which is derivable here from the inner diameter of measuring tube 3.

Figure 2:
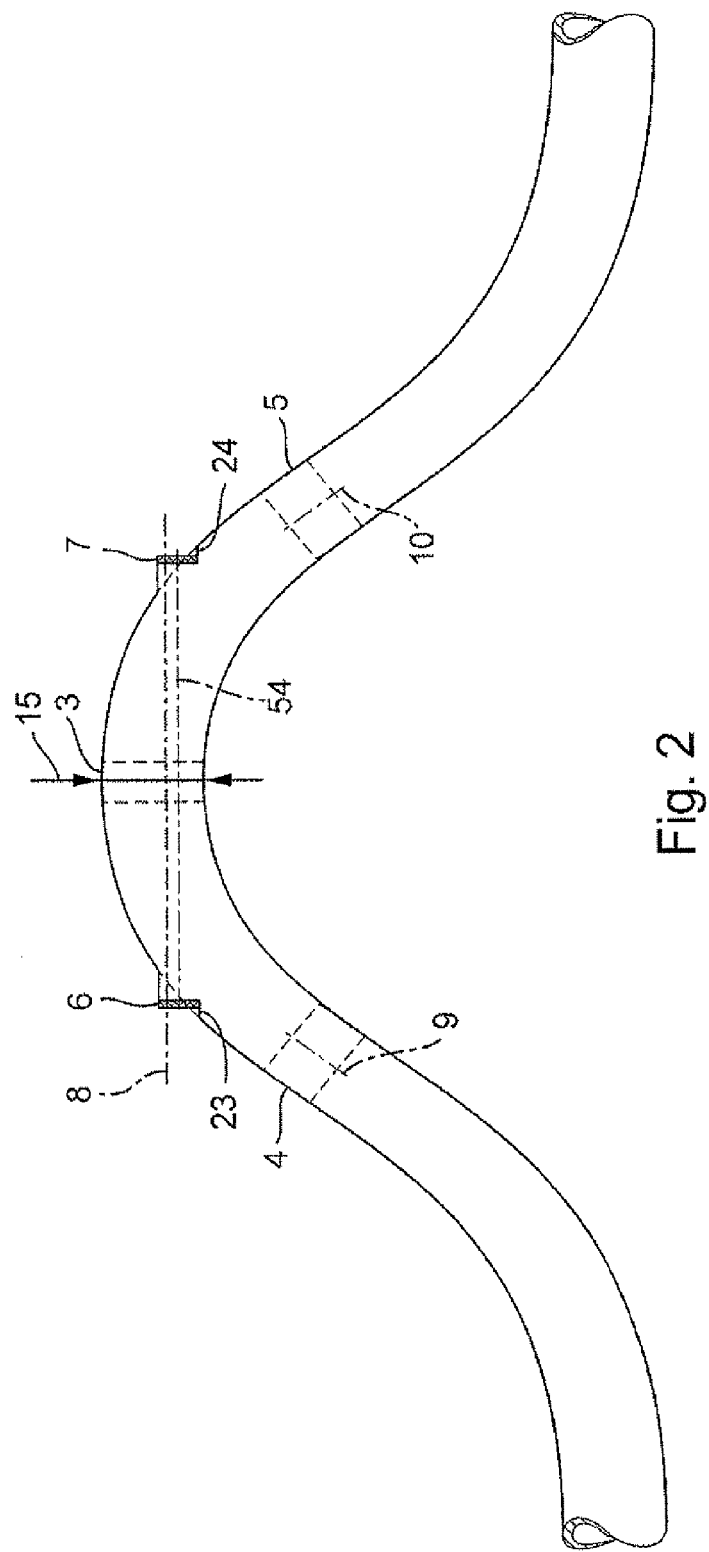
FIG. 2 is a further measuring system of the invention having a measuring tube of the invention.

FIG. 2 discloses a measuring system 1 of the invention with a further measuring tube 3 of the invention. In this example of an embodiment, measuring tube 3 has an approximately circularly round cross section and a short lengthwise extent relative to its diameter. Measuring tube inlet 4 and measuring tube outlet 5 also have approximately equal and circularly round cross sections. These are also short, viewed relative to their cross sections. In this example of an embodiment, measuring tube inlet 4 and measuring tube outlet 5 do not border directly on measuring tube 3. They are, however, in each case, connected with the latter via an intermediate tube 73, 74.

Intermediate tubes 73, 74 are curved and/or bent. A defining of straight-line axes in intermediate tubes 73, 74 is, consequently, not readily possible. Both measuring tube 3, as well as also measuring tube inlet 4 and measuring tube outlet 5 have here a certain length with a straight central axis 8, 9, 10, on which all centers of the respective tube 3, 4, 5 lie.

Measuring tube outlet axis 10 and measuring tube axis 8 define a first imaginary plane; thus, both measuring tube outlet axis 10 as well as also measuring tube axis 8 lie in the first imaginary plane, here the plane of the drawing. Perpendicular to this first imaginary plane extends a second imaginary plane, wherein measuring tube axis 8 lies in this second imaginary plane, measuring tube axis 8 thus being part of the first straight line of intersection between the first and second imaginary plane. The connecting line between the centers of the first and second electromechanical transducer elements 6 and 7 (which here lie planparallelly opposite each other), this line being here equal to the inscribed measuring path, extends on the side of the measuring tube outlet and does not intersect the second plane. The measuring path instead lies in an imaginary third plane, which divides the inner diameter 15 of measuring tube 3 into thirds, and extends parallel to the second imaginary plane. Along the measuring or signal path, the propagation of the ultrasonic waves produced by the electromechanical transducer elements 6 and 7 occurs. The measured travel-time difference of these waves both in the direction of flow and counter to the flow of the measured medium in the measuring tube 3 enters into the calculation of the flow.

Due to the measuring path 54 being arranged in a region of the measuring tube 3, where, due to the special shape of the measuring tube 3, a flow profile known through calibrating is present—thus, measuring path 54 is located, for example, in a flow, which is accelerated in comparison to the flow reigning in the region of the measuring tube axis, the quality of the measuring or determining of flow is increased, especially for viscous measured media or overall very slow flows and/or flow rates.

Figure 3:
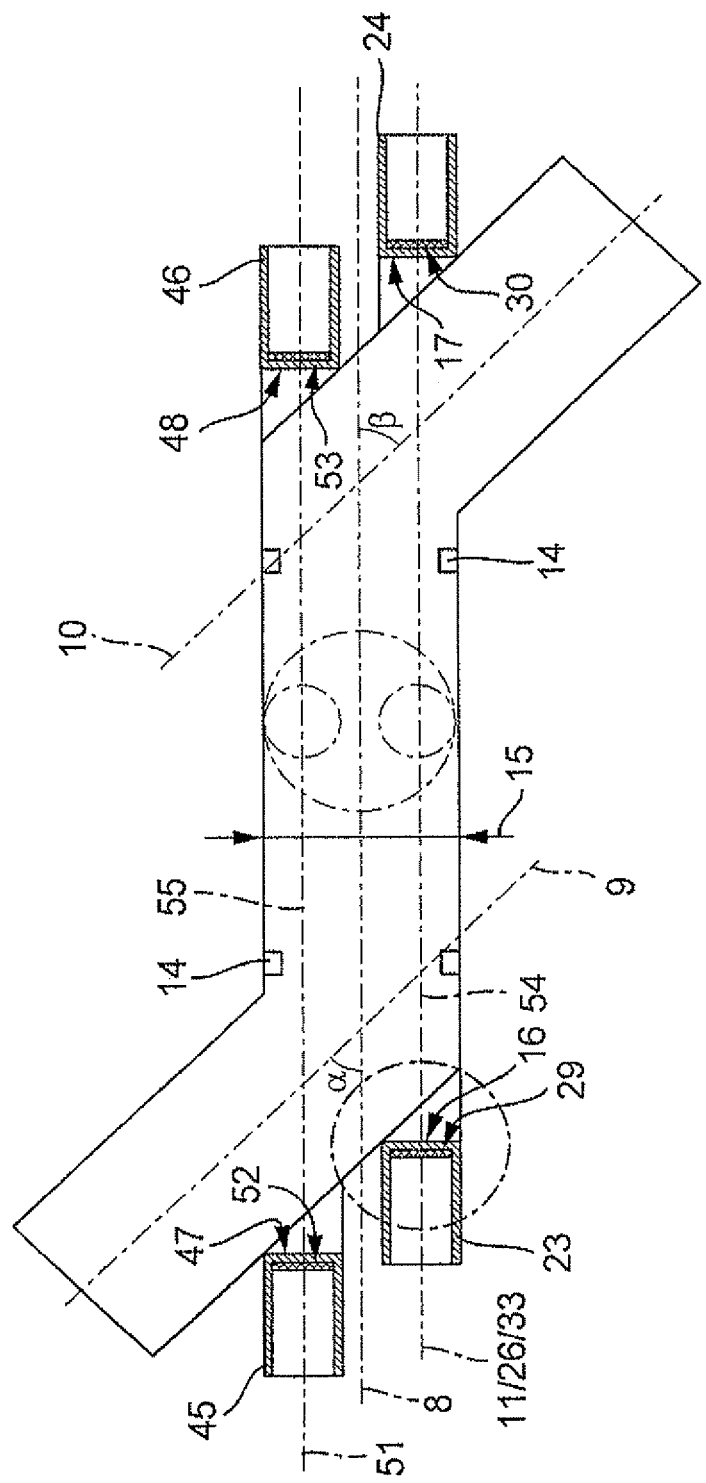
FIG. 3 is a further measuring system of the invention having a measuring tube of the invention.

FIG. 3 shows, schematically and in section, a further measuring tube 3 of the invention for a measuring system of the invention 1. It has essentially equal cross sections for measuring tube inlet 4 and outlet 5 and measuring tube 3. Both measuring tube inlet 4, as well as also measuring tube outlet 5 form angles of about 45° with measuring tube axis, thus $\alpha \approx \beta \approx 45°$. Furthermore, measuring tube 3 includes four ultrasonic transducer seats 23, 24, 45, 46. Ultrasonic transducer seats 23, 24, 45, 46 are, in each case, embodied in a pot-shaped manner. In the pot-shaped ultrasonic transducer seats 23, 24, 45, 46, electromechanical transducer elements 6, 7, 19, 20 can be installed. Ultrasonic transducer seats 23, 24, 45, 46 then serve as coupling elements between electromechanical transducer elements 6, 7, 19, 20 and the measured medium 2 in measuring tube 3. The electromechanical transducer elements 6, 7, 19, 20 are acoustically coupled with transducer seat surfaces 29, 30, 52, 53 of ultrasonic transducer seats 23, 24, 45, 46. In this example of an embodiment, the transducer seat surfaces 29, 30, 52, 53 likewise represent the pot inner floor of the pot-shaped ultrasonic transducer seats 23, 24, 45, 46.

The connecting line 26 between centers 27 and 28 of the first and second surface 16, 17 for coupling sound in and/or out, this line corresponding here to the connecting line 11 between first and second electromechanical transducer elements 6, 7, thus forms, according to the invention, an angle $\gamma$ with measuring tube axis 8. Here, this angle $\gamma$ is 0° or 180°, i.e. the connecting line 26 and measuring tube axis 8 are parallel to one another. The same is true for the connecting line 51 between the centers 49 and 50 of the third and fourth surface 47, 48 for coupling sound in and/or out.

The four ultrasonic transducer seats 23, 24, 45, 46 lie in pairs opposite one another, wherein the first and the third ultrasonic transducer seats 23, 45 lie in the region of measuring tube inlet 4, and the second and the fourth ultrasonic transducer seats 24, 46 are arranged in the region of measuring tube outlet 5. In this way, two measuring paths 54, 55 are yielded, wherein the first measuring path 54 is located between the first and second electromechanical transducer elements 6 and 7, which are here arranged in the first and second ultrasonic transducer seats 23, 24, and wherein the second measuring path 55 is located between the third and fourth electromechanical transducer elements 19 and 20, arranged in the third and fourth ultrasonic transducer seat 45, 46. In such case, the two measuring paths are parallel to measuring tube axis 8, i.e. they are arranged at an angle $\zeta$, and $\xi$, respectively, these being angles of approximately 0° or 180° to measuring tube axis 8, and the two measuring paths 54, 55, in each case, coincide with the respective connecting lines 11, 51, 26, 33 between the centers of the surfaces 16, 17, 47, 48 for coupling sound in and/or coupling sound out, and, respectively, transducer seat surfaces 29, 30, 52, 53. Transducer elements 6 and 7, as well as 19 and 20, which lie in pairs opposite each other, are thus essentially planparallel to one another. Of course, both electromechanical transducer elements 6, 7, 19, 20 as well as also surfaces 16, 17, 47, 48 for coupling sound in and/or coupling sound out are considerably smaller than the measuring tube diameter 15.

As the figure illustrates, measuring tube axis 8 divides the cross section of the inner diameter 15 of measuring tube 3 in two equally large parts. As can likewise be recognized without difficulty, this divided inner diameter 15 is in turn divided by the first measuring path 54. Surfaces 16 and 17 for coupling sound in and/or coupling sound out, which lie opposite each other, are located completely and clearly on the side of measuring tube axis 8, on which measuring tube outlet 5 also lies. Therefore, the first measuring path 54 also lies clearly on the other side of a line, which divides inner diameter 15 of measuring tube 3 into thirds. Here, the first measuring path 15 even lies on a side of a so-called fourth plane—that is a plane parallel to a second imaginary plane, wherein this fourth plane divides the inner diameter 15 of the measuring tube 3 into fourths—wherein measuring tube outlet 5 is also arranged on this side of the imaginary fourth plane, wherein the second imaginary plane is perpendicular to a first plane, with measuring tube axis 8 as the straight line of intersection between the first and second plane, wherein the first plane is defined by measuring tube axis 8 and measuring tube outlet 5.

Additionally, measuring tube 3 has on its inner side two rings 14, which reduce the free cross section of measuring tube 3. In this way, the flow of the measured medium in measuring tube 3 is conditioned, and the accuracy of measurement is increased. Rings 14 extend ⅒ of the inner diameter of the measuring tube into the measuring tube. Each ring 14 has a distance from the measuring tube inlet 4 or outlet 5 lying nearest to it of 0 to ½ the measuring tube length. Via the rings 14, a linearizing of the measurement characteristic curve is reached, which, however, simultaneously requires a change of the algorithm for determination of the Reynolds number.

Figure 4:
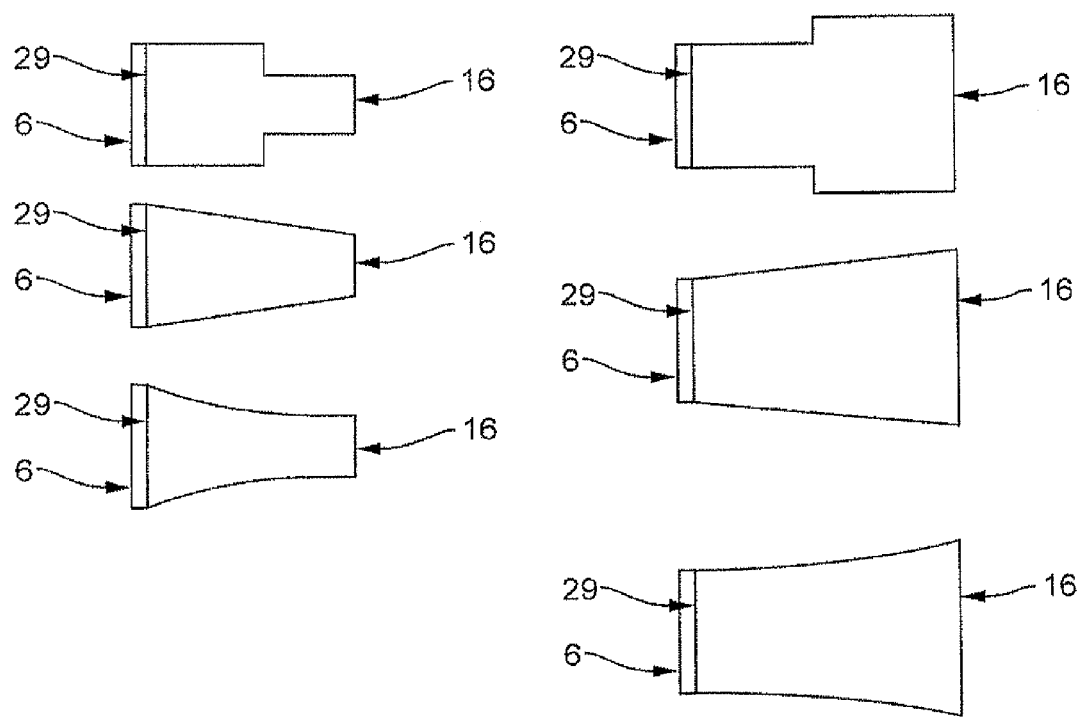
FIG. 4 shows various coupling elements in cross section.

In FIG. 4, different coupling elements are drawn in cross section. Through a reduction in the cross sectional area from transducer seating surface 29 to surface 16 for coupling sound in and/or out, the signal energy of the electromechanical transducer element 6 is concentrated. This is advantageous for radiating ultrasonic signals; a more focused ultrasonic beam is thereby obtained. Conversely, the increasing of the cross sectional area from transducer seating surface 29 to surface 16 for coupling sound in and/or out acts as a funnel for occurring ultrasonic signals. Their signal energy is, in turn, concentrated before impinging on the electromechanical transducer element 6.

The coupling elements take, in such case, different forms. Only a selection thereof is shown, without claim of completeness. Besides a step-shaped coupling element, coupling elements in the form of a frustum or of an exponential horn are also presented. A system of acoustic lenses is likewise imaginable.

Figure 5:
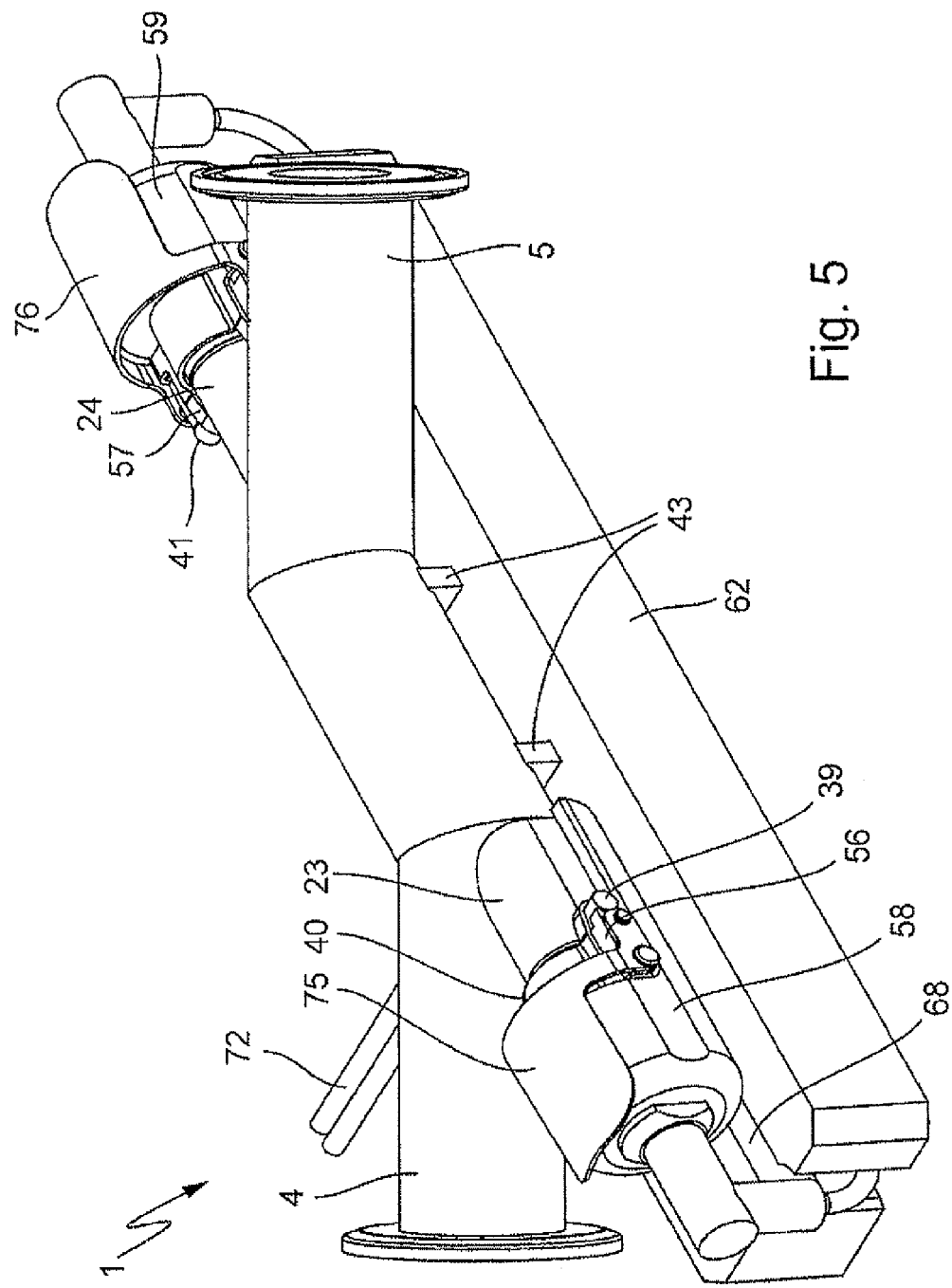
FIG. 5 is a measuring system of the invention having two ultrasonic transducers, a measuring tube and a base plate, as viewed from above.

Sketched three dimensionally in FIG. 5 is a measuring system 1 of the invention. This measuring system 1 includes a base plate 62 having a coupling (not shown) for securing the measuring tube 3. The measuring tube 3 in turn includes a plug 43 suitable for the coupling base plate 62. Via a plugging of the plug 43 into the coupling 44, measuring tube 3 is releasably connected with base plate 62, and secured against twisting and shifting. Measuring tube 3 can be moved relative to base plate 62 solely by unplugging. According to the invention, measuring tube 3 includes a measuring tube inlet 4 and a measuring tube outlet 5, which here lie in a plane.

Furthermore, this measuring system 1 includes a first ultrasonic transducer 58 and a second ultrasonic transducer 59. In this example of an embodiment, the second ultrasonic transducer 59 is, similarly to measuring tube 3, plugged into base plate 62 and releasably connected therewith. Thus, the second ultrasonic transducer 59 can also only be moved relative to the base plate 62 by means of unplugging. The first ultrasonic transducer 58, in contrast, is shiftably seated on base plate 62 coaxially to the measuring tube axis. It includes a first guide element (not shown here), which, together with a second guide element 68 of base plate 62, assures the shiftability of the first ultrasonic transducer 58. Here, the second guide element 68 is a T-groove. A track, which is secured on the first ultrasonic transducer 58 and correspondingly embodied, enables shape-interlocking connection of first ultrasonic transducer 58 and base plate 62 with simultaneous degree of freedom for the first ultrasonic transducer 58 coaxially to the measuring tube axis. For mounting, the first ultrasonic transducer 58 is pushed onto measuring tube 3, and, by rotating the first latch 56, acoustically coupled to the measuring tube 3.

The first ultrasonic transducer 58 includes a first latch 56, and the second ultrasonic transducer 59 also includes a second latch 57. The latches 56, 57 are embodied in such a manner that, in the closed state, they engage with the pins 39, 40, 41 arranged on measuring tube 3 or on the ultrasonic transducer seats 23, 24, and thus releasably secure ultrasonic transducers 58 and 59 on the measuring tube 3. A possible embodiment of the mechanism for the securement is presented in FIGS. 8a and 8b. By toggling the clamping yokes 75 and 76, the latchs 56, 57 are thrown, and the ultrasonic transducers 58 and 59 are mounted or released from the measuring tube. FIG. 5 shows ultrasonic transducers 58 and 59 in the mounted state, and therewith shows latchs 56 and 57 in a closed state. The clamping yokes 75 and 76 serve here simultaneously as safety latches and locking levers.

Figure 6A:
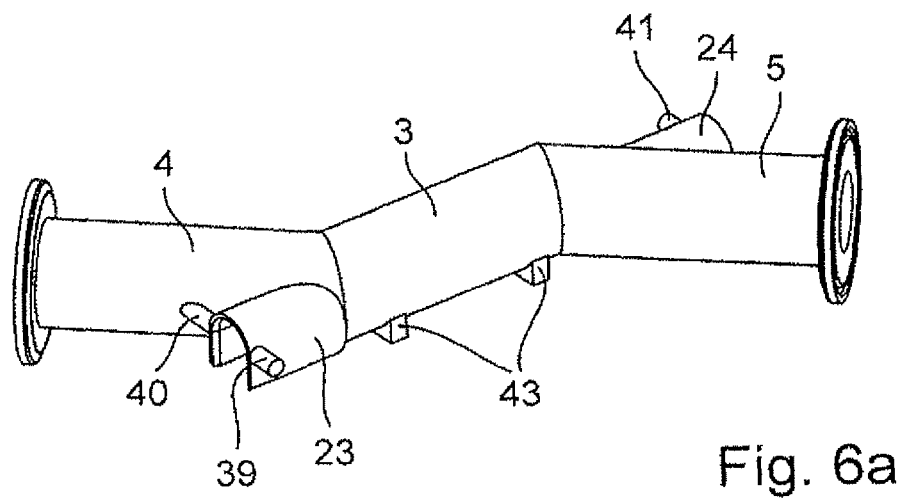
FIG. 6 shows 3 dimensional images of a measuring tube of the invention.
Figure 6B:
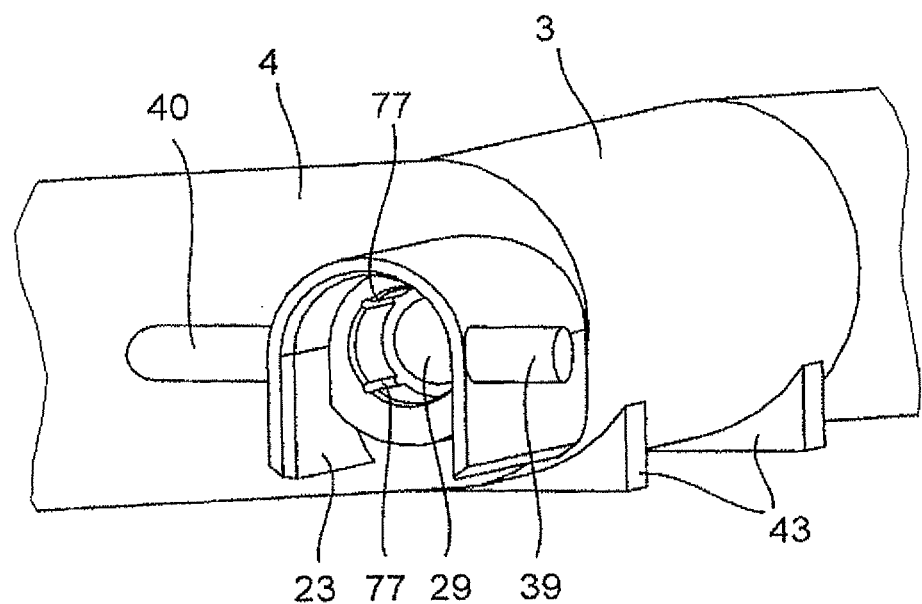

FIGS. 6a and 6b illustrate measuring tube 3 of FIG. 5, with measuring tube inlet 4 and measuring tube outlet 5. Shown are ultrasonic transducer seats 23 and 24, which are offset from the center of measuring tube 3. In this way, a measuring path arises, which extends on the side the measuring tube axis, on which measuring tube outlet 5 is located. Furthermore, plug 43 is provided on the measuring tube 3 for the docking of the measuring tube 3 onto a base plate, and pins 39, 40, 41 are provided for the coupling of ultrasonic transducers. The first ultrasonic transducer seat 23 is embodied in a pot-shaped manner. A first transducer seating surface 29 forms the pot floor of ultrasonic transducer seat 23. The first electromechanical transducer element 6 can be acoustically coupled to this first transducer seating surface 29, either directly or indirectly, via a first coupling element of the first ultrasonic transducer. For guiding the first ultrasonic transducer, the first ultrasonic transducer seat 23 includes guiding rails 77, which serve here for measuring tube axis coaxial orientation and for guiding the first ultrasonic transducer.

Figure 7:
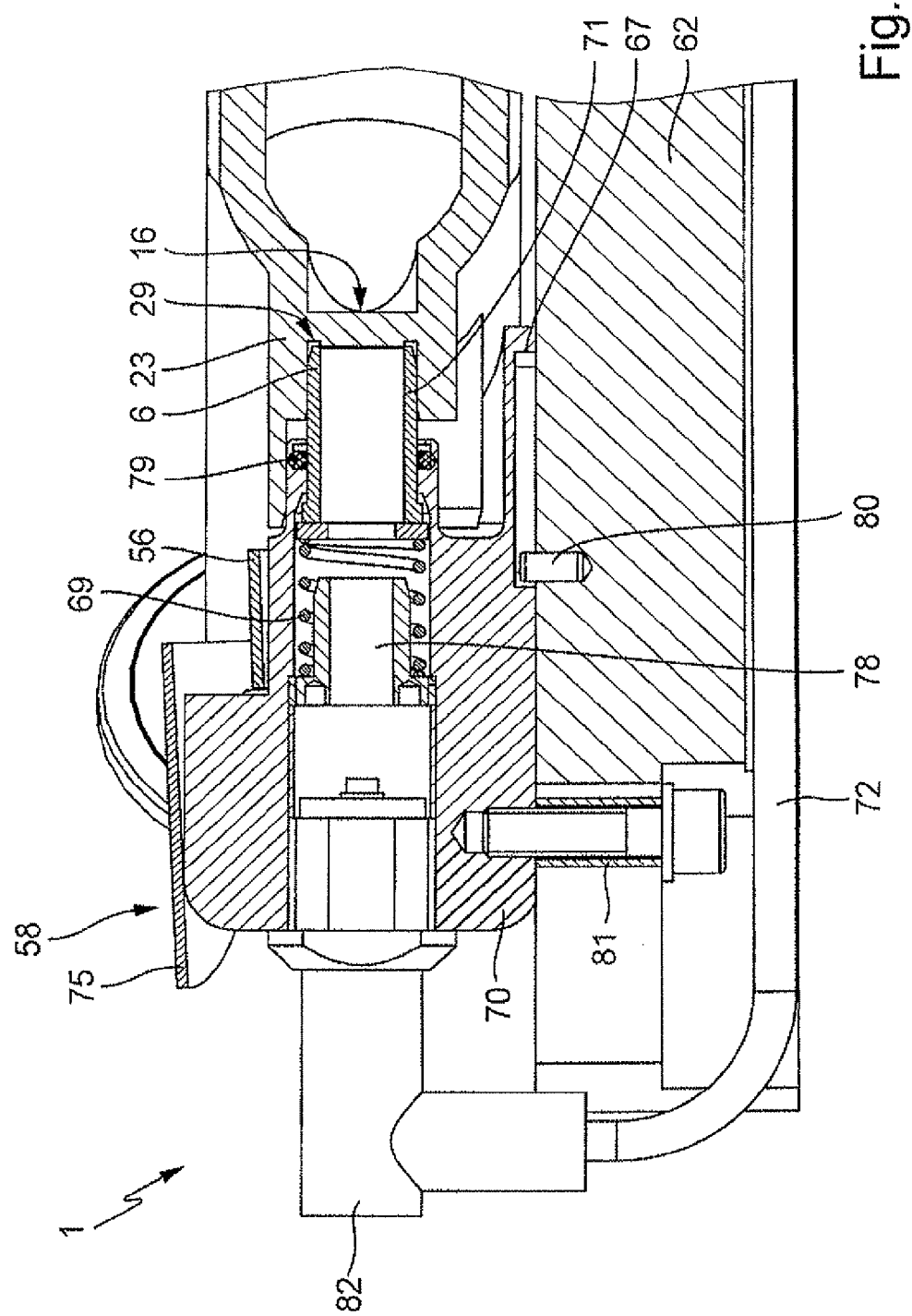
FIG. 7 is a detailed cross section of a measuring system of the invention

FIG. 7 shows a cross section through a measuring system 1 of the invention having a measuring tube of the invention, a first ultrasonic transducer 58 and a base plate 62. The first ultrasonic transducer 58 includes a first electromechanical transducer element 6, by means of which received ultrasonic signals are converted into electrical signals, or, which transduces electrical signals into ultrasonic signals. The first electromechanical transducer element 6 is arranged on the tip of a so-called sensor cup 71. Sensor cup 71 is implemented in the first ultrasonic transducer seat 23. The first electromechanical transducer element 6 is in approximately gapless acoustic contact with the first transducer seating surface 29 of first ultrasonic transducer seat 23. The centers of the first transducer seating surface 29 of the first ultrasonic transducer seat 23 and the first electromechanical transducer element 6 lie on an axis, wherein this axis is the same as the connecting line between the centers of the first surface 16 for coupling sound in and/or out of the first ultrasonic transducer seat 23 and the second surface for coupling sound in and/or out of the second ultrasonic transducer seat, and is therewith the same as the first measuring path. The first ultrasonic transducer seat 23 is shown in a pot-shaped form, with the first transducer seating surface 29 serving as the pot floor.

The first electromechanical transducer element 6 and, respectively, the sensor cup 71 is spring biased via a helical spring 69. The spring force of helical spring 69 depends on, among other things, the position of the first ultrasonic transducer 58 relative to the first transducer seating surface 29. In the mounted state—thus when latches 56 are closed by toggling the first clamping yoke 75, and thus when the latches 56 have engaged with the pins on the measuring tube—such position is influenced only by manufacturing tolerances of the individual components. The spring force can be adjusted by means of an adjusting screw 78. Adjusting screw 78 is connected with the housing 70 of the first ultrasonic transducer 58. The helical spring 69 lies, on the one hand, against adjusting screw 78, and, on the other hand, against the sensor cup 71. Via adjusting screw 78, a predetermined force on first electromechanical transducer element 6 or on first transducer seating surface 29 can be selected.

In the axis parallel to the measuring path, first ultrasonic transducer 58 of the securement mechanism is secured with the latches and the pins. The other degrees of freedom are limited by means of first and second guide elements, which are arranged on the first ultrasonic transducer 58 and the base plate 62. In the mounted state, a movement of first ultrasonic transducer 58 relative to base plate 62 is possible only to the extent of the compression of spring 69. The tasks and functions of the first and second guide elements, that is the so-called linear guiding of ultrasonic transducer 58 on base plate 62, are in this embodiment assigned to a cylindrical pin 80, which is firmly anchored in base plate 62, and to a guide track 67 in the ultrasonic transducer. Additionally, a screw in a spacing sleeve 81 is to a limited degree capable of a relative movement coaxially to the measuring path.

Figure 8A:
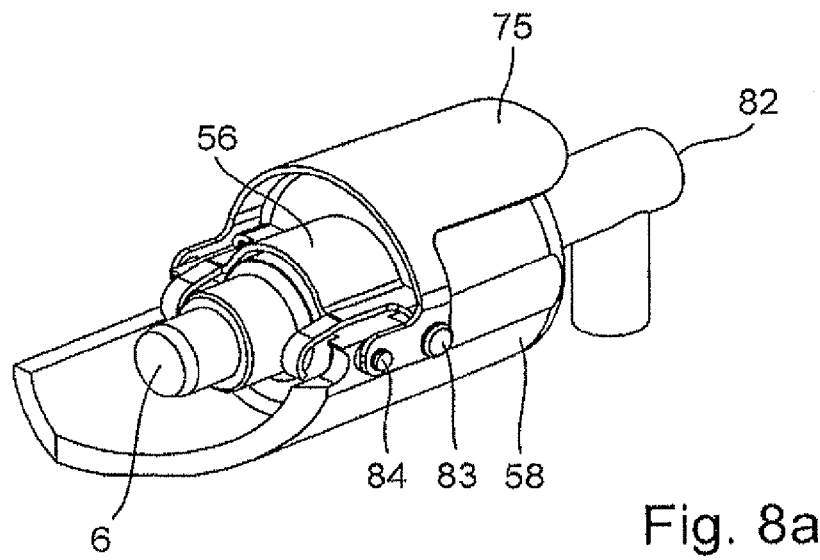
FIG. 8 is a latch closure of the invention closure in 3D.
Figure 8B:
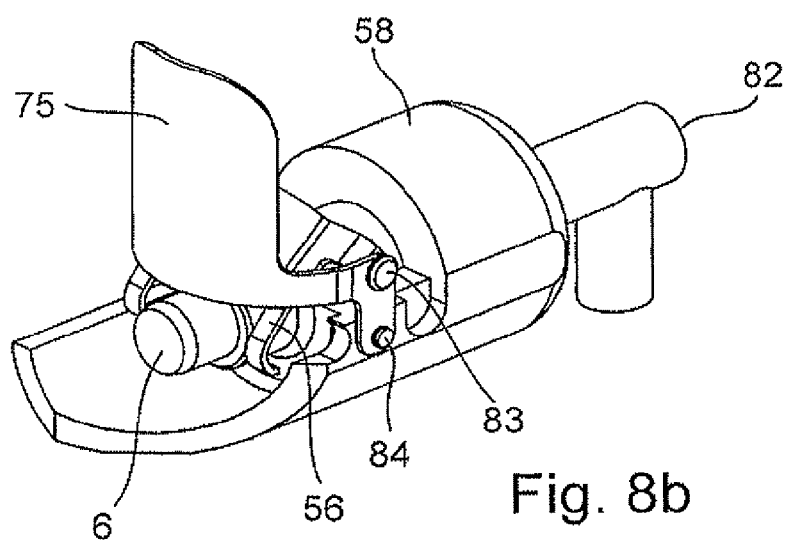

FIGS. 8a and 8b show a mechanism for securement of the ultrasonic transducer to the measuring tube. The first ultrasonic transducer 58 is shown in FIG. 8a with a closed securement mechanism, i.e. with a closed latch, and in FIG. 8b with an open latch. The first electromechanical transducer element 6 of ultrasonic transducer 58 can be seen, which is pressed onto the transducer seating surface (not shown) of the measuring tube in the mounted state. Via the angle plug 82 arranged on the other end of the ultrasonic transducer 58, the cables are led under the base plate.

A first axis 83 connects the first latch 56 and the first clamping yoke 75 in the manner shown. Via the second axis 84, only clamping yoke 75 is secured to ultrasonic transducer 58. In this way, in the case of a toggling of clamping yoke 75, there results a rotary and translational movement of first latch 56. This first latch is, in turn, embodied in such a manner, that it can engage the pin of the measuring tube, and thus secure the ultrasonic transducer to the measuring tube.

Figure 9:
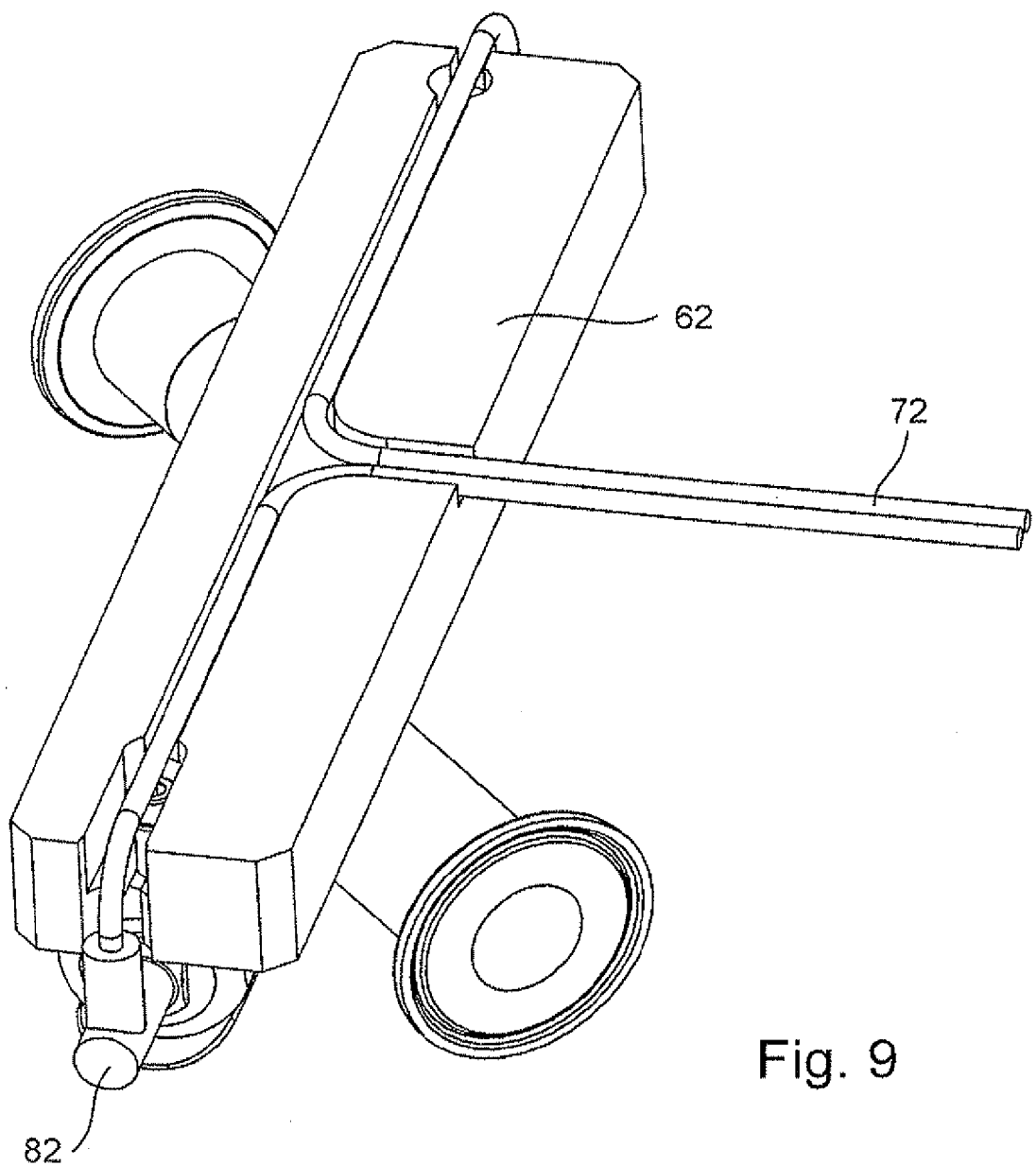
FIG. 9 is a cable guide in a base plate of the invention.

FIG. 9 shows the underside of the previously described base plate 62. Shown is a cable conduit on the underside of base plate 62—thus on the side of the base plate facing away from the measuring tube—in which the cables 72 of the ultrasonic transducers are conveyed, concealed in base plate 62 and protected from external influences. Cables 72 are led via an angle plug 82 from the ultrasonic transducers to the underside of base plate 62.

Figure 10:
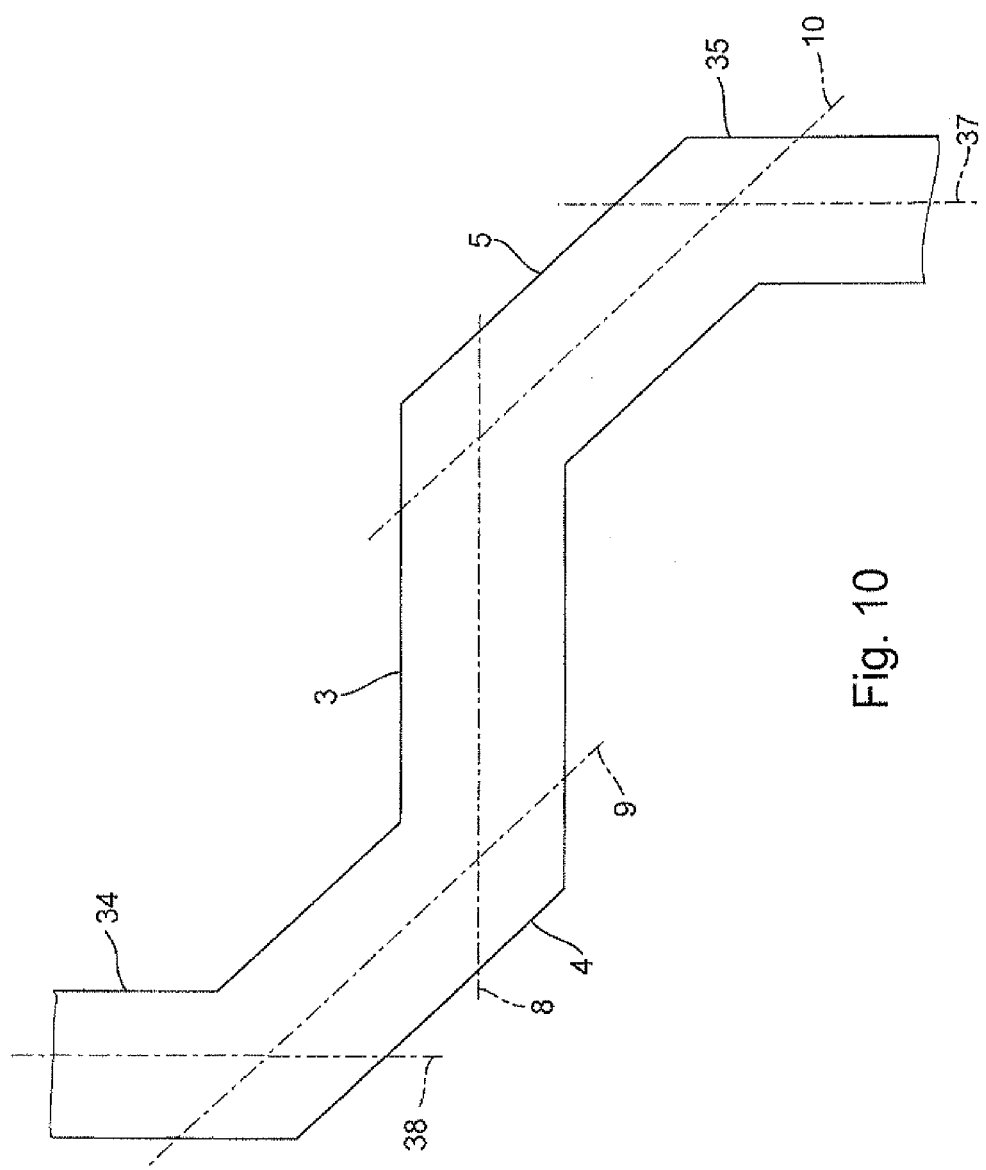
FIG. 10 is a further measuring tube of the invention.

FIG. 10 shows an embodiment of an additional measuring tube 3 of the invention. Measuring tube 3 includes a first measuring tube inlet 4 and a first measuring tube outlet 5, which are arranged on measuring tube 3 at an angle of approximately 45° to measuring tube 3, i.e. the first measuring tube inlet axis 9 and the first measuring tube outlet axis 10, in each case, form an angle of about 45° with measuring tube axis 8. The first measuring tube inlet 4 and first measuring tube outlet 5 lie, in such case, on oppositely lying sides of measuring tube 3, i.e. the first measuring tube inlet axis 9 and the first measuring tube outlet axis 10 are parallel to one another and lie essentially in a plane.

Measuring tube 3 in this case includes an additional inlet section, i.e. an additional, second measuring tube inlet 34, and an additional outlet section, i.e. an additional, second measuring tube outlet 35, which, for their own part, in each case, have a central axis 36, 37. Second measuring tube inlet 34, in such case, borders on the first measuring tube inlet 4, and second measuring tube outlet 35 borders on the first measuring tube outlet 5. The second measuring tube inlet axis 36 forms in this example of an embodiment an angle of essentially 90° with the measuring tube axis, and the second measuring tube outlet axis 37 here likewise forms an angle of essentially 90° with the measuring tube axis. Also the second measuring tube inlet axis 36 and the second measuring tube outlet axis 37 lie in the same plane as the first measuring tube inlet axis 9, the first measuring tube outlet axis 10 and the measuring tube axis 8. In this way, flow of the measured medium in measuring tube 3 is conditioned in a predetermined manner.

The invention claimed is:

1. A measuring tube for use in a measuring system for determining and/or monitoring flow of a measured medium through the measuring tube, with a measuring tube axis, comprising:
    a first ultrasonic transducer seat for seating at least a first electromechanical transducer element;
    at least one additional, second ultrasonic transducer seat for seating at least a second electromechanical transducer element;
    a measuring tube inlet; and
    a measuring tube outlet, which measuring tube inlet has a measuring tube inlet axis, which measuring tube inlet axis has an angle $\alpha$ not equal to 90° relative to the measuring tube axis and which measuring tube outlet has a measuring tube outlet axis, which measuring tube outlet axis has an angle $\beta$ not equal to 90° relative to the measuring tube axis, wherein:
    said first ultrasonic transducer seat is a first coupling element between said first electromechanical transducer element and the measured medium and has a first sound in- and/or sound out-coupling surface having a center;
    said second ultrasonic transducer seat is a second coupling element between said second electromechanical transducer element and the measured medium and has a second sound in- and/or sound out-coupling surface having a center; and
    said ultrasonic transducer seats are so embodied that a first measuring path between said two electromechanical transducer elements lies at an angle $\zeta$ relative to the measuring tube axis and extends on the side of the measuring tube axis, on which said measuring tube outlet is located.

2. The measuring tube as claimed in claim 1, wherein:
    a connecting line between said centers of said first and second sound in- and/or sound out-coupling surfaces lies at an angle $\eta$ relative to the measuring tube axis and extends on the side of the measuring tube axis, on which said measuring tube outlet is located.

3. The measuring tube as claimed in claim 1, wherein:
    said first sound in- and/or sound out-coupling surface and said second sound in- and/or sound out-coupling surface face one another essentially planparallelly.

4. The measuring tube as claimed in claim 1, wherein:
    said ultrasonic transducer seats have, in each case, at least one transducer seating surface, which are acoustically coupleable with said ultrasonic transducers, which transducer seating surfaces face one another essentially planparallelly and, in each case, have a center; and
    a connecting line between the centers of said first and second transducer seating surfaces lies at an angle $\theta$ relative to the measuring tube axis and extends on the side of the measuring tube axis, on which said measuring tube outlet is located.

5. The measuring tube as claimed in claim 1, wherein:
    said ultrasonic transducers acoustically coupleable on said transducer seating surfaces have, in each case, a center, and a connecting line between the centers of said first and second ultrasonic transducers lies at an angle $\gamma$ relative to the measuring tube axis and extends on the side of the measuring tube axis, on which said measuring tube outlet is located.

6. The measuring tube as claimed in claim 1, wherein:
    $\zeta$ equals $\gamma$ and/or $\zeta$ equals $\eta$ and/or $\zeta$ equals $\theta$ and/or $\eta$ equals $\gamma$ and/or $\eta$ equals $\theta$ and/or $\theta$ equals $\gamma$.

7. The measuring tube as claimed in claim 1, wherein:
    said measuring tube inlet and said measuring tube outlet are arranged on oppositely lying sides of the measuring tube.

8. The measuring tube as claimed in claim 1, wherein:
    the angle $\alpha$ amounts to approximately 45°.

9. The measuring tube as claimed in claim 1, wherein:
    the measuring tube axis, the measuring tube inlet axis and the measuring tube outlet axis lie essentially in one plane.

10. The measuring tube as claimed in claim 1, wherein:
    the measuring tube has an additional inlet segment and an additional outlet segment, said additional inlet segment is arranged on said measuring tube inlet and the additional outlet segment is arranged on said measuring tube outlet; said additional inlet segment has a second measuring tube inlet axis and said additional outlet segment has a second measuring tube outlet axis;

said second measuring tube inlet axis has an angle of essentially 90° relative to the measuring tube axis; and said second measuring tube outlet axis has an angle of essentially 90° relative to the measuring tube axis.

11. The measuring tube as claimed in claim 1, wherein:
the area of said first sound in- and/or sound out-coupling surface is not equal to the area of said first transducer seating surface and/or the area of said second sound in- and/or sound out-coupling surface is not equal to the area of said second transducer seating surface.

12. The measuring tube as claimed in claim 1, wherein:
the measuring tube has a third ultrasonic transducer seat for seating at least a third electromechanical transducer element and a fourth ultrasonic transducer seat for seating at least a fourth electromechanical transducer element;

said third ultrasonic transducer seat is a third coupling element between said third electromechanical transducer element and the measured medium and has a third sound in- and/or sound out-coupling surface;

the fourth ultrasonic transducer seat is a fourth coupling element between said fourth electromechanical transducer element and the measured medium and has a fourth sound in- and/or sound out-coupling surface; and said third and fourth ultrasonic transducer seat are so embodied that a second measuring path between said third and said fourth electromechanical transducer elements lies at an angle relative to the measuring tube axis and extends on the side of the measuring tube axis, which lies opposite said first measuring path.

13. The measuring tube as claimed in claim 1, wherein:
the angle $\xi$ is approximately equally large as the angle $\zeta$.

14. The measuring tube as claimed in claim 1, wherein:
at least one ultrasonic transducer seat is pot shaped, with the transducer seating surface of said ultrasonic transducer seat being the pot floor.

15. The measuring tube as claimed in claim 1, wherein:
the measuring tube has cross section narrowing rings.

* * * * *